(12) United States Patent
Iijima (10) Patent No.: US 6,485,547 B1
(45) Date of Patent: Nov. 26, 2002

(54) EXHAUST GAS COOLING SYSTEM

(75) Inventor: Masaki Iijima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 63 days.

(21) Appl. No.: 09/722,598

(22) Filed: Nov. 28, 2000

(30) Foreign Application Priority Data

Apr. 17, 2000 (JP) .......................................... 2000-115379

(51) Int. Cl.[7] .................................................. B01D 47/00
(52) U.S. Cl. ............................................ 96/242; 96/266
(58) Field of Search .......................... 95/187, 228, 229; 96/265, 266, 242

(56) References Cited

U.S. PATENT DOCUMENTS

| | | | |
|---|---|---|---|
| 2,876,833 A | * | 3/1959 | Kelley et al. |
| 2,889,003 A | * | 6/1959 | Koch |
| 3,018,231 A | * | 1/1962 | Valentine et al. |
| 5,846,299 A | * | 12/1998 | Pravda |
| 6,348,088 B2 | * | 2/2002 | Chung |

FOREIGN PATENT DOCUMENTS

| | | |
|---|---|---|
| DE | 3112997 A | 10/1982 |
| EP | 0328990 A | 8/1989 |
| FR | 2703136 A | 9/1994 |
| JP | 52-013473 A | 2/1977 |
| JP | 09-269116 | 10/1997 |
| JP | 10-146516 | 6/1998 |
| JP | 11-211387 A | 8/1999 |
| WO | 94/21968 A1 | 9/1994 |

* cited by examiner

*Primary Examiner*—Duane S. Smith
(74) *Attorney, Agent, or Firm*—Birch, Stewart, Kolasch & Birch, LLP (57) ABSTRACT

An exhaust gas cooling system includes, an exhaust gas-processing tower provided at a lower portion with an inlet port for an exhaust gas containing moisture and also provided at an upper interior space with a spray member, a circulating passageway for circulating exhaust gas-processing water from the bottom of the exhaust gas-processing tower to the spray member, a heat exchanger provided at a midway of the circulating passageway for, cooling the exhaust gas-processing water, a cooling tower for generating cooling water by taking advantage of the evaporation heat of water, thereby allowing the cooling water to circulate through the heat exchanger, and a water supply passageway for supplying the exhaust gas-processing water passing through circulating passageway to the cooling tower as part of-make-up water.

6 Claims, 3 Drawing Sheets

EXHAUST GAS COOLING SYSTEM

CROSS-REFERENCE TO RELATED APPLICATIONS

This application is based upon and claims the benefit of priority from the prior Japanese Patent Application No. 2000-115379, filed Apr. 17, 2000, the entire contents of which are incorporated herein by reference.

BACKGROUND OF THE INVENTION

This invention relates to an exhaust gas cooling system.

The exhaust gas to be emitted from the combustion in a boiler, etc. incorporated in a power-generating installation such as a thermal power plant for instance contains a large quantity of carbon dioxide. This carbon dioxide is known to bring about a green house effect causing a global warm-up phenomenon, and hence researches for the countermeasure to the generation of carbon dioxide is an urgent problem internationally at present in view of preserving the global environment. Under the circumstances, a method of removing and recovering carbon dioxide from exhaust gas by contacting the exhaust gas with an absorbent such as an aqueous solution of alkanolamine as well as a method of reserving the carbon dioxide thus recovered without allowing carbon dioxide to be released into air atmosphere are intensively studied.

However, since the exhaust gas generated from the combustion in a boiler is high in temperature (for example, about 190° C.), it is impossible to directly contact the exhaust gas with the aforementioned aqueous solution of alkanolamine. Therefore, the absorption and recovery of the exhaust gas is now precooled to about 40° C. before the exhaust gas is introduced into the aqueous solution of alkanolamine.

Figure 5:
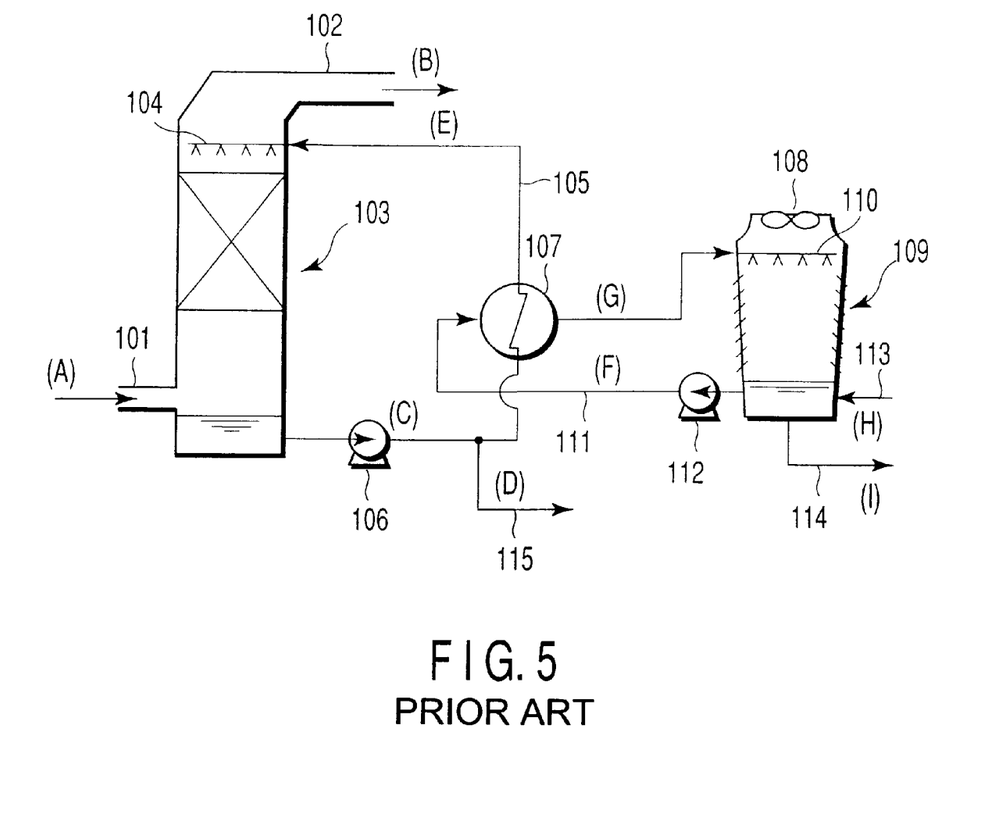
FIG. 5 is a schematic view illustrating the exhaust gas cooling system according to the prior art.

In the meantime, there is known an apparatus shown in FIG. 5 as a cooling system for cooling the exhaust gas. Namely, according to this cooling system of exhaust gas, an exhaust gas-processing tower 103 has an exhaust gas inlet port 101 at a lower portion thereof and an exhaust gas outlet pipe 102 at an upper portion thereof. A spray member 104 for spraying cooled water is provided at an upper portion of the interior space of the processing tower 103. A circulating passageway 105 is provided in such a way that one end thereof is connected with a lower sidewall of the processing tower 103, while the other end thereof is connected with the spray member 104. A first pump 106 is provided at a midway of the circulating passageway 105 which is located in the vicinity of an exhaust gas-processing water discharge port of the processing tower 103. A heat exchanger 107 for cooling the exhaust gas-processing water is provided at a midway of the circulating passageway 105.

A cooling tower 109 provided at an upper portion thereof with a fan 108 for generating the cooling water by taking advantage of the evaporation heat of water is disposed next to the exhaust gas-processing tower 103. A spray member 110 for spraying cooled water is provided at an upper portion of the interior space of the cooling tower 109. A cooling water-circulating passageway 111 is provided in such a way that one end thereof is connected with a lower sidewall of the cooling tower 109, while the other end thereof is connected via the heat exchanger 107 with the cooling water spray member 110. The cooling water-circulating passageway 111 is designed to circulate cooling water from a lower sidewall of the cooling tower 109 via the heat exchanger 107 to the cooling water spray member 110.

A second pump 112 is provided at a midway of the cooling water-circulating passageway 111 which is located in the vicinity of the cooling tower 109. A make-up passageway 113 is connected with a lower sidewall of the cooling tower 109 so as to supply water from outside the system to the bottom portion of the cooling tower 109. A blow-down passageway 114 is connected with the bottom of the cooling tower 109, thereby allowing water to be continuously or periodically discharged from the bottom portion of the cooling tower 109.

According to this conventional exhaust gas cooling system, an exhaust gas containing water, for example an exhaust gas generated through the combustion of hydrocarbon, is introduced from the inlet port 101 into the exhaust gas-processing tower 103. The first pump 106 is actuated so as to supply an exhaust gas-processing water from the bottom portion of the exhaust gas-processing tower 103 via the circulating passageway 105 to the heat exchanger 107. On this occasion, as the second pump 112 is actuated, the cooling water of the bottom of the cooling tower 109 is supplied via the cooling water-circulating passageway 111 to the heat exchanger 107.

As a result, the exhaust gas-processing water is cooled down, and the resultant cool water is supplied via the circulating passageway 105 to the spray member 104. The cooled water is then ejected from the spray member 104 into the space inside the exhaust gas-processing tower 103 so as to cool the exhaust gas that has been introduced into the exhaust gas-processing tower 103. The exhaust gas thus cooled is then transferred via the exhaust gas outlet pipe 102 to the absorption tower for carbon dioxide for example. On the other hand, the cooling water whose temperature has been raised at the heat exchanger 107 through the heat exchange thereof with the exhaust gas-processing water is fed via the cooling water-circulating passageway 111 to the cooling water spray member 110 of the cooling tower 109.

The cooling water thus warmed is then ejected from the spray member 110 into the space inside the cooling tower 109 and by the actuation of the fan 108, is cooled due to the evaporation heat to be generated through the evaporation of water accumulated at the bottom of the cooling tower 109. This cooling water is then accumulated at the bottom portion of the cooling tower 109. The water inside the cooling tower 109 is consumed through the evaporation thereof. In order to compensate this consumption of water, water (make-up water) is supplied from outside the system to the cooling tower 109 through make-up passageway 113.

According to the aforementioned exhaust gas cooling system however, when an exhaust gas containing moisture (for example, an exhaust gas to be generated from the combustion of hydrocarbon) is introduced into the exhaust gas-processing tower 103 and then, cooled water is ejected through the spray member 104 disposed at an upper portion of the exhaust gas-processing tower 103, the water included in the exhaust gas is caused to condense and stored, as a condensate, at the bottom portion of the exhaust gas-processing tower 103. Since the volume of exhaust gas-processing water is caused to substantially increase due to the generation of this condensed water, part of exhaust gas-processing water is required to be discharged outside the system from the bottom of the exhaust gas-processing tower 103 via a discharge passageway 115. As a result, the load for processing waste water is caused to increase, thus raising a problem.

Furthermore, since the water circulating through the cooling water-circulating passageway 111 is cooled by taking advantage of the evaporation of water at the water inside the cooling tower 109, it is required to supply water from outside the system to the cooling tower 109 through make-up passageway 113. Since this external water contains salts such as calcium, etc., the salts are also caused to concentrate in the circulation process in the cooling water-circulating passageway 111. As a result, the water containing a concentration of salts is required to be frequently discharged outside the system from the bottom of the cooling tower 109 via the blow-down passageway 114.

BRIEF SUMMARY OF THE INVENTION

Therefore, an object of this invention is to provide an exhaust gas cooling system wherein a portion of exhaust gas-processing water incorporating therein the condensed water that has been generated through the condensation of moisture included in the exhaust gas at the exhaust gas-processing tower is introduced as a make-up water into a cooling tower, thereby making it possible to minimize the load for processing waste water, to decrease the quantity of water to be supplied to the cooling tower, and to minimize the frequency of the blow-down from the cooling tower.

Another object of this invention is to provide an exhaust gas cooling system which is capable of omitting the provision of a heat exchanger, of reducing the manufacturing cost of the system, of miniaturizing the cooling tower, and of reducing the capacity thereof.

Namely, this invention provides an exhaust gas cooling system comprising;

an exhaust gas-processing tower provided at a lower portion with an inlet port for an exhaust gas containing moisture and also provided at an upper interior space with a spray member;

a circulating passageway for circulating an exhaust gas-processing water from a bottom portion of the exhaust gas-processing tower to the spray member;

a heat exchanger provided at a portion of the circulating passageway for cooling the exhaust gas-processing water;

a cooling tower for generating the cooling water by taking advantage of the evaporation heat of water, thereby allowing the cooling water to circulate passing through the heat exchanger; and a water supply passageway for supplying the exhaust gas-processing water passing through the circulating passageway to the cooling tower as a portion of make-up water.

According to this invention, there is also provided an exhaust gas cooling system comprising;

an exhaust gas-processing tower provided at a lower portion with an inlet port for an exhaust gas containing moisture and also provided at an upper interior space with a spray member; and a cooling tower for cooling an exhaust gas-processing water existing at a bottom portion of the exhaust gas-processing tower by taking advantage of the evaporation heat of water, thereby allowing the water thus cooled to be fed to a spray member of the exhaust gas-processing tower.

In the exhaust gas cooling system of this invention, the exhaust gas-processing tower may be constructed such that it is provided with an exhaust gas outlet pipe which is connected with a carbon dioxide absorption tower.

The exhaust gas cooling system of this invention may further comprise an air cooler which is provided at a portion of a passageway located between the exhaust gas-processing water outlet port of the exhaust gas-processing tower and the cooling tower.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Next, the exhaust gas cooling system according to this invention will be explained with reference to the drawings.

(First Embodiment)

Figure 1:
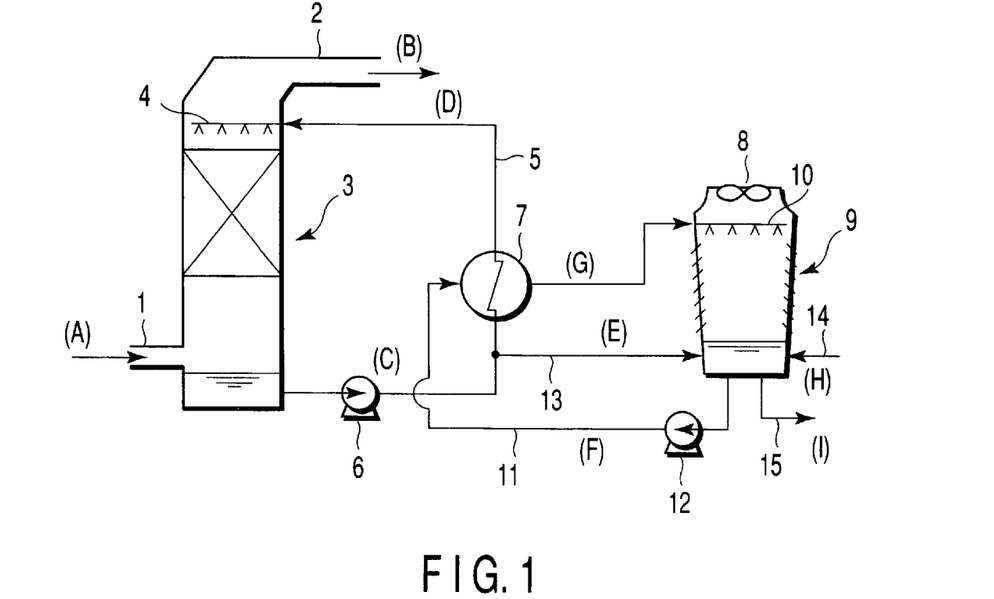
FIG. 1 is a schematic view illustrating the exhaust gas cooling system according to a first Embodiment of this invention.

FIG. 1 is a schematic view illustrating the exhaust gas cooling system according to a first Embodiment of this invention.

According to this exhaust gas cooling system, an exhaust gas-processing tower 3 has an exhaust gas inlet port 1 at a lower portion and an exhaust gas outlet pipe 2 at an upper portion. This exhaust gas outlet pipe 2 is connected with an absorption tower (not shown) for carbon dioxide. A spray member 4 for spraying cooled water is provided at an upper portion of the interior space of the exhaust gas-processing tower 3. A circulating passageway 5 is provided in such a way that one end thereof is connected with a lower sidewall of the processing tower 3, while the other end thereof is connected with the spray member 4. A first pump 6 is provided at a midway of the circulating passageway 5 which is located in the vicinity of an exhaust gas-processing water discharge port of the processing tower 3. A heat exchanger 7 for cooling the exhaust gas-processing water is provided at a midway of the circulating passageway 5.

A cooling tower 9 provided at an upper portion thereof with a fan 8 for generating the cooling water by taking advantage of the evaporation heat of water is disposed next to the exhaust gas-processing tower 3. A spray member 10 for spraying cooled water is provided at an upper portion of the interior space of the cooling tower 9. A cooling water-circulating passageway 11 is provided in such a way that one end thereof is connected with a lower sidewall of the cooling tower 9, while the other end thereof is connected via the heat exchanger 7 with the cooling water spray member 10. The cooling water-circulating passageway 11 is designed to circulate cooling water from a lower sidewall of the cooling tower 9 via the heat exchanger 7 to the cooling water spray member 10. A second pump 12 is provided at a midway of the cooling water-circulating passageway 11 which is located in the vicinity of the cooling tower 9.

A water supply passageway 13 is branched at a portion of the circulating passageway 5 which is located between the first pump 6 and the heat exchanger 7, the distal end of the branched passageway being connected with a lower sidewall of the cooling tower 9. This water supply passageway 13 functions so as to supply the exhaust gas-processing water flowing through the circulating passageway 5 to the cooling tower 9 as a portion of the make-up water. A make-up water passageway 14 is connected with a lower sidewall of the cooling tower 9, thereby allowing water to be supplied to the bottom portion of the cooling tower 9 from outside the system. A blow-down passageway 15 is connected with the bottom of the cooling tower 9, thereby allowing water to be periodically discharged from the bottom portion of the cooling tower 9.

In the operation of this exhaust gas cooling system shown in FIG. 1, an exhaust gas containing moisture (for example an exhaust gas generated through the combustion of hydrocarbon) is introduced from the inlet port 1 into the exhaust gas-processing tower 3. The first pump 6 is actuated so as to supply an exhaust gas-processing water from the bottom portion of the exhaust gas-processing tower 3 via the circulating passageway 5 to the heat exchanger 7. On this occasion, as the second pump 12 is actuated, the cooling water of the bottom of the cooling tower 9 is supplied via the cooling water-circulating passageway 11 to the heat exchanger 7.

As a result, the exhaust gas-processing water is cooled down, and the resultant cool water is supplied via the circulating passageway 5 to the spray member 4. The cooled water is then ejected from the spray member 4 into the space inside the exhaust gas-processing tower 3 so as to cool the exhaust gas that has been introduced into the exhaust gas-processing tower 3. The exhaust gas thus cooled is then transferred via the exhaust gas outlet pipe 2 to the absorption tower for carbon dioxide so as to absorb and remove the carbon dioxide contained in the exhaust gas.

During this cooling process of exhaust gas, the moisture in the exhaust gas is condensed and stored as a condensed water containing no salt in the bottom portion of the exhaust gas-processing tower 3.

On the other hand, the cooling water whose temperature has been raised at the heat exchanger 7 through the heat exchange thereof with the exhaust gas-processing water is fed via the cooling water-circulating passageway 11 to the cooling water spray member 10 of the cooling tower 9.

The cooling water thus warmed is then ejected from the spray member 10 into the space inside the cooling tower 9 and by the actuation of the fan 8, is cooled due to the evaporation heat to be generated through the evaporation of water accumulated at the bottom of the cooling tower 9. This cooling water is then accumulated at the bottom portion of the cooling tower 9.

The water inside the cooling tower 9 is consumed through the evaporation thereof. In order to compensate this consumption of water through the evaporation thereof, water (make-up water) is supplied from outside the system to the cooling tower 9 through the make-up passageway 14. The exhaust gas-processing water mixed with the aforementioned condensed water is separated at a portion of the circulating passageway 5 which is located between the first pump 6 and the heat exchanger 7, and supplied, as a portion of make-up water, via a water supply passageway 13 to the cooling tower 9.

According to the aforementioned first Embodiment, when the exhaust gas is cooled at the exhaust gas-processing tower 3, the condensed water is obtained through the condensation of moisture in an exhaust gas. The condensed water is mixed together with the exhaust gas-processing water, and the resultant water is supplied through the operation of the first pump 6 to the cooling tower 9 via the water supply passageway 13 so as to be utilized as a portion of the make-up water. As a result, it is now possible to obtain an exhaust gas cooling system which is capable of reducing the load of waste water processing as compared with the conventional system wherein the exhaust gas-processing water is discharged from the exhaust gas-processing tower.

Further, since the quantity of make-up water to be supplied to the cooling tower 9 can be reduced, this system is very advantageous in economical viewpoint especially in a region water is very precious such as in the Middle East where water is produced through the desalination of sea water.

Moreover, since the condensed water to be obtained through the condensation of moisture in the exhaust gas at the exhaust gas-processing tower 3 is free from salts such as calcium, it can be utilized as a portion of make-up water to be supplied to the cooling tower 9 without inviting a substantial increase in concentration of salts in the cooling water to be circulated through the cooling water-circulating passageway 11 for cooling water in the cooling tower 9 as compared with the conventional system wherein only the make-up water containing salts is supplied to the cooling tower 9. As a result, the frequency of blow-down of water containing a high concentration of salts from the cooling tower 9 via the blow-down passageway 15 can be minimized.

Table 1 shows the temperature of exhaust gas after cooling, the quantity of make-up water at the cooling tower, and the quantity of blow-down, etc., all of which were obtained when the exhaust gas cooling system according to the first Embodiment and constructed as shown in FIG. 1 was operated using a water-containing exhaust gas having the temperatures and components as shown in Table 1 under the conditions as shown in Table 1.

Namely, the item (A) in Table 1 represents an exhaust gas to be introduced via the gas inlet port 1 of the exhaust gas-processing tower 3; the item (B) represents an exhaust gas of the exhaust gas outlet pipe 2; the item (C) represents an exhaust gas-processing water to be fed from the first pump 6; the item (D) represents a cooled water to be supplied via the heat exchanger 7 to the spray member 4; the item (E) represents an exhaust gas-processing water to be fed from the water supply passageway 13 to the cooling tower 9; the item (F) represents a cooling water at a midway portion of the cooling water-circulating passageway 11, which is located between the second pump 12 and the heat exchanger 7; the item (G) represents a cooling water at a midway portion of the cooling water-circulating passageway 11, which is located between the heat exchanger 7 and the cooling water spray member 10; the item (H) represents the make-up water to be fed from the make-up water passageway 14; and the item (I) represents the water to be discharged from the blow-down passageway 15. These items (A) to (I) are also shown in FIG. 1.

Table 2 shows the temperature of exhaust gas after cooling, the quantity of make-up water at the cooling tower, and the quantity of blow-down, etc., all of which were obtained when the conventional exhaust gas cooling system as shown in FIG. 5 was operated using a water-containing exhaust gas having the temperatures and components as shown in Table 2 under the conditions as shown in Table 2.

Namely, the item (A) in Table 2 represents an exhaust gas to be introduced via the gas inlet port 101 of the exhaust gas-processing tower 103; the item (B) represents an exhaust gas of the exhaust gas outlet pipe 102; the item (C) represents an exhaust gas-processing water to be fed from the first pump 106; the item (D) represents an exhaust gas-processing water of the discharge passageway 115; the item (E) represents a cooled water to be supplied via the heat exchanger 107 to the spray member 104; the item (F) represents a cooling water at a midway portion of the cooling water-circulating passageway 111, which is located between the second pump 112 and the heat exchanger 107; the item (G) represents a cooling water at a midway portion of the cooling water-circulating passageway 111, which is located between the heat exchanger 107 and the cooling water spray member 110; the item (H) represents the make-up water to be fed from the make-up water passageway 113; and the item (I) represents the water to be discharged from the blow-down passageway 114. These items (A) to (I) are also shown in FIG. 5.

As shown in Tables 1 and 2, according to the exhaust gas cooling system of the first Embodiment shown in FIG. 1, it is possible to sufficiently cool the exhaust gas down to a low temperature (46° C.) as in the case of the conventional exhaust gas cooling system shown in FIG. 5. Further, the quantity of the make-up water to the cooling tower as well as the quantity of blow-down from the cooling tower can be further reduced as compared with the conventional exhaust gas cooling system shown in FIG. 5.

(Second Embodiment)

Figure 2:
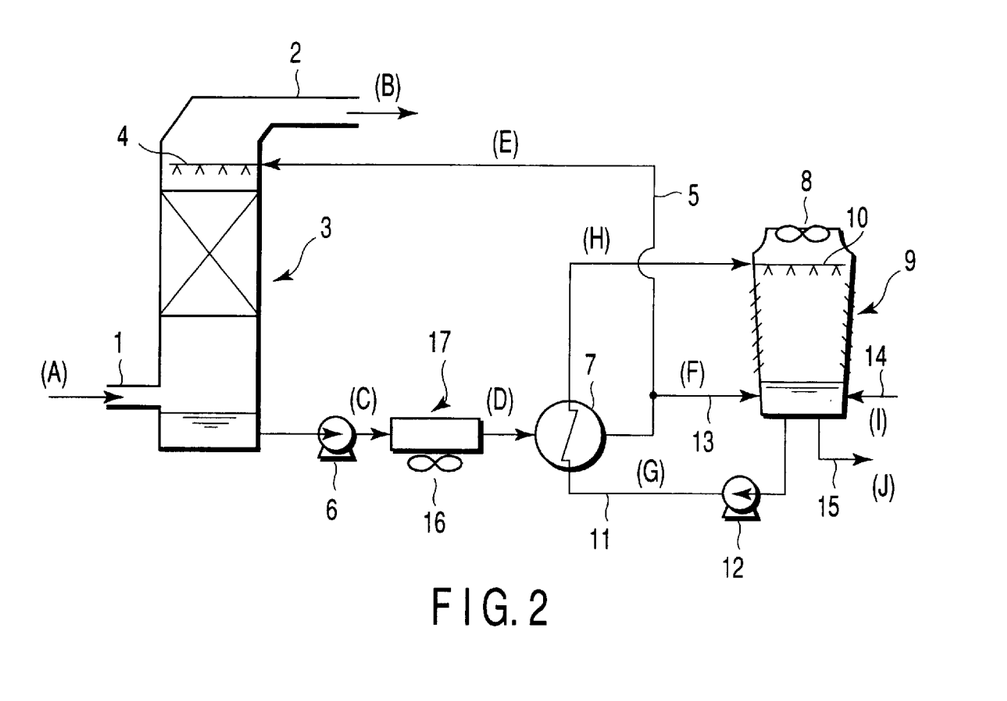
FIG. 2 is a schematic view illustrating the exhaust gas cooling system according to a second Embodiment of this invention.

FIG. 2 is a schematic view illustrating the exhaust gas cooling system according to a second Embodiment of this invention. By the way, the same members or components as those shown in FIG. 1 will be identified by the same numbers thereby omitting the explanation thereof.

This exhaust gas cooling system is featured in that an air cooler 17 provided with a fan 16 is interposed between the first pump 6 and the heat exchanger 7.

According to this exhaust gas cooling system, on the occasion of supplying the exhaust gas-processing water from the bottom portion of the exhaust gas-processing tower 3 via the circulating passageway 5 to the heat exchanger 7 by means of the first pump 6, the exhaust gas-processing water can be cooled in advance by the air cooler 17 that has

TABLE 1

| Item | (A) | (B) | (C) | (D) | (E) | (F) | (G) | (H) | (I) |
|---|---|---|---|---|---|---|---|---|---|
| Temperature (° C.) | 188 | 46 | 66 | 43 | 66 | 33 | 43 | 33 | 33 |
| Composition | | | | | | | | | |
| $N_2$ (mol %) | 68.79 | 80.49 | — | — | — | — | — | — | — |
| $O_2$ (mol %) | 0.85 | 0.99 | — | — | — | — | — | — | — |
| $CO_2$ (mol %) | 8.08 | 9.45 | — | — | — | — | — | — | — |
| $H_2O$ (mol %) | 22.28 | 9.07 | 100.00 | 100.00 | 100.00 | 100.00 | 100.00 | 100.00 | 100.00 |
| Total (mol %) | 100.00 | 100.00 | 100.00 | 100.00 | 100.00 | 100.00 | 100.00 | 100.00 | 100.00 |
| Exhaust gas flow rate ($Nm^3/hr$) | 46,693 | 39,908 | — | — | — | — | — | — | — |
| Flow rate of cooling water (kg/hr) | — | — | 236,400 | 230,900 | 5,500 | 523,000 | 523,000 | 6,500 | 1,100 |

TABLE 2

| Item | (A) | (B) | (C) | (D) | (E) | (F) | (G) | (H) | (I) |
|---|---|---|---|---|---|---|---|---|---|
| Temperature (° C.) | 188 | 46 | 66 | 66 | 43 | 33 | 43 | 33 | 33 |
| Composition | | | | | | | | | |
| $N_2$ (mol %) | 68.79 | 80.49 | — | — | — | — | — | — | — |
| $O_2$ (mol %) | 0.85 | 0.99 | — | — | — | — | — | — | — |
| $CO_2$ (mol %) | 8.08 | 9.45 | — | — | — | — | — | — | — |
| $H_2O$ (mol %) | 22.28 | 9.07 | 100.00 | 100.00 | 100.00 | 100.00 | 100.00 | 100.00 | 100.00 |
| Total (mol %) | 100.00 | 100.00 | 100.00 | 100.00 | 100.00 | 100.00 | 100.00 | 100.00 | 100.00 |
| Exhaust gas flow rate ($Nm^3/hr$) | 46,693 | 39,908 | — | — | — | — | — | — | — |
| Flow rate of cooling water (kg/hr) | — | — | 236,400 | 5,500 | 230,900 | 523,000 | 523,000 | 12,000 | 2,000 | been provided at a midway of the circulating passageway 5. As a result, it is possible to obtain almost the same effects as obtained in the aforementioned first Embodiment. Further, it is also possible to miniaturize the cooling tower 9 which is designed to supply a cooling water to the heat exchanger 7 via the cooling water-circulating passageway 11, and also possible to reduce the cooling capacity thereof.

Table 3 shows the temperature of exhaust gas after cooling, the quantity of make-up water at the cooling tower, and the quantity of blow-down, etc., all of which were obtained when the exhaust gas cooling system according to the second Embodiment and constructed as shown in FIG. 2 was operated using a water-containing exhaust gas having the temperatures and components as shown in Table 3 under the conditions as shown in Table 3.

Namely, the item (A) in Table 3 represents an exhaust gas to be introduced via the gas inlet port 1 of the exhaust gas-processing tower 3; the item (B) represents an exhaust gas of the exhaust gas outlet pipe 2; the item (C) represents an exhaust gas-processing water to be fed from the first pump 6 to the air cooler 17; the item (D) represents an exhaust gas-processing water to be fed from the air cooler 17 to the heat exchanger 7; the item (E) represents a cooled water to be supplied via the heat exchanger 7 to the spray member 4; the item (F) represents an exhaust gas-processing water to be fed from the water supply passageway 13 to the cooling tower 9; the item (G) represents a cooling water at a midway portion of the cooling water-circulating passageway 11, which is located between the second pump 12 and the heat exchanger 7; the item (H) represents a cooling water at a midway portion of the cooling water-circulating passageway 11, which is located between the heat exchanger 7 and the cooling water spray member 10; the item (I) represents the make-up water to be fed from the make-up water passageway 14; and the item (J) represents the water to be discharged from the blow-down passageway 15. These items (A) to (J) are also shown in FIG. 2.

tower can be further reduced as compared with the exhaust gas cooling system of the first Embodiment shown in FIG. 1. These results can be attributed to the fact that in the case of the exhaust gas cooling system of the second Embodiment, the air cooler 17 is provided at a portion of the circulating passageway 5, which is located on the upstream side of the heat exchanger 17, thus making it possible to miniaturize the cooling tower 9 and also to reduce the cooling capacity thereof.

(Third Embodiment)

Figure 3:
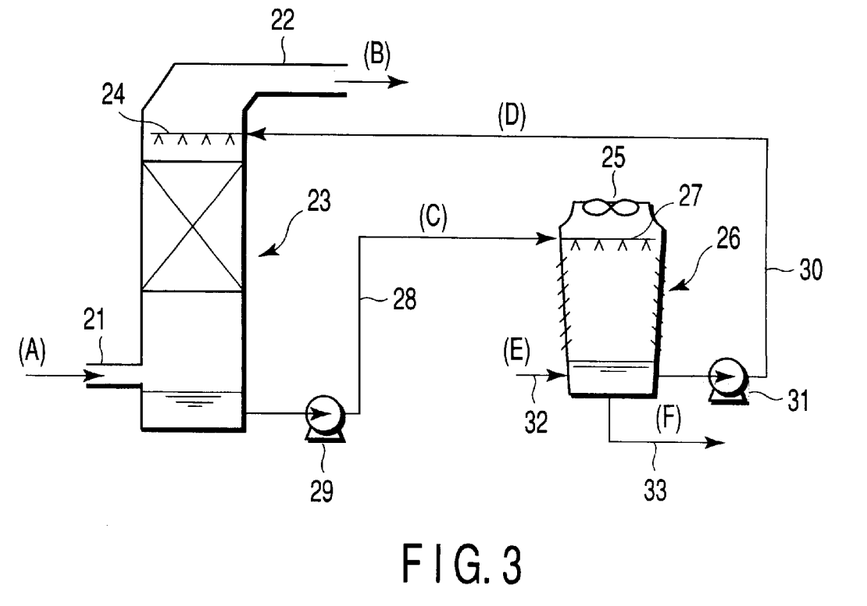
FIG. 3 is a schematic view illustrating the exhaust gas cooling system according to a third Embodiment of this invention.

FIG. 3 is a schematic view illustrating the exhaust gas cooling system according to a third Embodiment of this invention.

According to this exhaust gas cooling system, an exhaust gas-processing tower 23 has an exhaust gas inlet port 21 at a lower portion thereof and an exhaust gas outlet pipe 22 at an upper portion thereof. This exhaust gas outlet pipe 22 is connected with an absorption tower (not shown) for carbon dioxide. A spray member 24 for spraying cooled water is provided at an upper portion of the interior space of the exhaust gas-processing tower 23.

A cooling tower 26 provided at an upper portion thereof with a fan 25 for generating the cooling water by taking advantage of the evaporation heat of water is disposed next to the exhaust gas-processing tower 23. A spray member 27 for spraying. cooled water is provided at an upper portion of the interior space of the cooling tower 26. An exhaust gas-processing water passageway 28 is provided in such a way that one end thereof is connected with a lower sidewall of the exhaust gas-processing tower 23, while the other end thereof is connected with the cooling water spray member 27. A first pump 29 is provided at a midway of the exhaust gas-processing water passageway 28 which is located in the vicinity of a lower sidewall of the exhaust gas-processing tower 23.

A cooling water-circulating passageway 30 is provided in such a way that one end thereof is connected with a lower

TABLE 3

| Item | (A) | (B) | (C) | (D) | (E) | (F) | (G) | (H) | (I) | (J) |
|---|---|---|---|---|---|---|---|---|---|---|
| Temperature (° C.) | 188 | 46 | 66 | 50 | 43 | 43 | 33 | 43 | 33 | 33 |
| Composition | | | | | | | | | | |
| $N_2$ (mol %) | 68.79 | 80.49 | — | — | — | — | — | — | — | — |
| $O_2$ (mol %) | 0.85 | 0.99 | — | — | — | — | — | — | — | — |
| $CO_2$ (mol %) | 8.08 | 9.45 | — | — | — | — | — | — | — | — |
| $H_2O$ (mol %) | 22.28 | 9.07 | 100.00 | 100.00 | 100.00 | 100.00 | 100.00 | 100.00 | 100.00 | 100.00 |
| Total (mol %) | 100.00 | 100.00 | 100.00 | 100.00 | 100.00 | 100.00 | 100.00 | 100.00 | 100.00 | 100.00 |
| Exhaust gas flow rate (Nm$^3$/hr) | 46,693 | 39,908 | — | — | — | — | — | — | — | — |
| Flow rate of cooling water (kg/hr) | — | — | 236,400 | 236,400 | 230,900 | 5,500 | 165,480 | 165,480 | 3,600 | 500 |

As seen from Table 3, according to the exhaust gas cooling system of the second Embodiment shown in FIG. 2, it is possible to sufficiently cool the exhaust gas down to a low temperature (46° C.) as in the case of the exhaust gas cooling system of the first Embodiment shown in FIG. 1. Further, the quantity of the make-up water to the cooling tower as well as the quantity of blow-down from the cooling sidewall of the cooling tower 26, while the other end thereof is connected with the spray member 24 of the exhaust gas-processing tower 23. A second pump 31 is provided at a midway of the cooling water-circulating passageway 30 which is located in the vicinity of a lower sidewall of the cooling tower 26.

A make-up passageway 32 is connected with a lower sidewall of the cooling tower 26, thereby enabling water to be fed to the bottom portion of the cooling tower 26 from outside the system. The blow-down passageway 33 is connected with a bottom portion of the cooling tower 26, thereby enabling water to be discharged from the bottom portion of the cooling tower 26.

In the operation of this exhaust gas cooling system shown in FIG. 3, an exhaust gas containing moisture (for example an exhaust gas generated through the combustion of hydrocarbon) is introduced from the inlet port 21 into the exhaust gas-processing tower 23. The first pump 29 is actuated so as to supply an exhaust gas-processing water from the bottom portion of the exhaust gas-processing tower 23 via the exhaust gas-processing water passageway 28 to the cooling water spray member 27 of the cooling tower 26.

The exhaust gas-processing water thus supplied is then ejected from the spray member 27 into the space inside the cooling tower 26 and, by the actuation of the fan 25, is cooled due to the evaporation heat to be generated through the evaporation of water accumulated at the bottom of the cooling tower 26. This cooling water is then accumulated at the bottom portion of the cooling tower 26. Namely, the exhaust gas-processing water in the bottom portion of the exhaust gas-processing tower 23 is directly fed to the cooling tower 26 so as to be cooled therein.

The cooling water accommodated inside the cooling tower 26 is transferred through the operation of the second pump 31 to the spray member 24 of the exhaust gas-processing tower 23 via the cooling water supply passageway 30. The cooling water is then ejected from the spray member 24 into the space inside the exhaust gas-processing tower 23, thereby cooling the exhaust gas that has been introduced into the exhaust gas-processing tower 23. The exhaust gas thus cooled is then transferred via the discharge pipe 22 to the carbon dioxide absorption tower, thus enabling the carbon dioxide in the exhaust gas to be absorbed and removed.

The moisture contained in the exhaust gas is allowed to condense in the cooling process of the exhaust gas to thereby generate a condensed water which is free from salts such as calcium and reserved in the bottom portion of the exhaust gas-processing tower 23.

On the other hand, the water inside the cooling tower 26 is consumed through the evaporation thereof during the cooling process thereof. In order to compensate this consumption of water, water (make-up water) is supplied from outside the system to the cooling tower 26 through the make-up passageway 32.

According to the third Embodiment, the exhaust gas-processing water reserved in the bottom portion of the exhaust gas-processing tower 23 is directly supplied via the exhaust gas-processing water passageway 28 to the cooling water spray member 27 of the cooling tower 26, so that the heat exchanger that has been built in the conventional exhaust gas cooling system as shown in FIG. 5 can be omitted, thus making it possible to reduce the manufacturing cost of the exhaust gas cooling system.

Furthermore, the cooling by the cooling tower 26 is directed to the exhaust gas-processing water that has been directly supplied from the exhaust gas-processing tower 23. Namely, since the cooling is performed in a single step, it is now possible to miniaturize the cooling tower 26 and also to reduce the cooling capacity thereof.

Namely, in the case of the exhaust gas cooling system provided with a heat exchanger wherein a cooling water discharged from the cooling tower is circulated and cooled through a heat exchange with the exhaust gas-processing water inside the bottom portion of the exhaust gas-processing tower (i.e. an exhaust gas-processing tower/cooling tower separation type) as shown in FIG. 5, it is required to perform a two-step cooling for the purpose of keeping a predetermined temperature respectively at the heat exchanger for performing the heat exchange of the exhaust gas-processing water/the cooling water and at the cooling tower for performing the heat exchange of the cooling water after the heat exchange/the evaporation heat of water. Therefore, the cooling tower is required to have a sufficient cooling capacity for keeping the aforementioned temperature, so that the cooling tower is required to be increased in size as well as in function for enhancing the cooling capacity.

Whereas in the case of the exhaust gas cooling system of this third Embodiment, it is possible, by way of a single step of cooling using the cooling tower 26, to enhance the cooling efficiency as compared with the conventional exhaust gas cooling system where the exhaust gas-processing tower and the cooling tower are separated from each other. Therefore, it is possible to miniaturize the cooling tower 26 and also to reduce the cooling capacity thereof. Additionally, the quantity of cooling water to be fed to the spray member 24 of the exhaust gas-processing tower 23 through the operation of the second pump 31 can be reduced.

Further, since the exhaust gas to be introduced into the exhaust gas-processing tower 23 is confined to an exhaust gas containing moisture such as an exhaust gas that will be produced through the combustion of hydrocarbon for instance, it is possible to allow the water to condense as the exhaust gas is cooled in the exhaust gas-processing tower 23 by ejecting a cooling water against the exhaust gas from the spray member 24, thereby making it possible to obtain a condensed water which is free from salts such as calcium and to incorporate the condensed water into the exhaust gas-processing water. Therefore, by directly supplying this exhaust gas-processing water incorporated with the condensed water to the cooling tower 26 via the exhaust gas-processing water passageway 28, the condensed water can be utilized as a portion of the make-up water for the cooling tower 26.

As a result, it is now possible to reduce the load of waste water processing as compared with the conventional system as shown in FIG. 5 wherein an excessive amount of the exhaust gas-processing water due to the aforementioned condensation of water is discharged from the exhaust gas-processing tower.

Further, since the quantity of make-up water to be supplied to the cooling tower 26 can be reduced, this system is very advantageous in economical viewpoint especially in a region water is very precious such as in the Middle East where water is produced through the desalination of sea water.

Moreover, since the condensed water to be obtained through the condensation of moisture in exhaust gas at the exhaust gas-processing tower 23 is free from salts such as calcium, it can be utilized as a portion of make-up water to be supplied to the cooling tower 26 without increasing the concentration of salts in the cooling water to be cooled by taking advantage of the evaporation of water in the cooling tower 26 as compared with the increase in concentration in the conventional system wherein only the make-up water containing salts is supplied to the cooling tower 26. As a result, the frequency of blow-down of water containing a high concentration of salts from the cooling tower 26 via the blow-down passageway 33 can be minimized.

Table 4 shows the temperature of exhaust gas after cooling, the quantity of make-up water at the cooling tower, and the quantity of blow-down, etc., all of which were obtained when the exhaust gas cooling system according to the third Embodiment and constructed as shown in FIG. 3 was operated using a water-containing exhaust gas having the temperatures and components as shown in Table 4 under the conditions as shown in Table 4.

Namely, the item (A) in Table 4 represents an exhaust gas to be introduced via the gas inlet port 21 of the exhaust gas-processing tower 23; the item (B) represents an exhaust gas of the exhaust gas outlet pipe 22; the item (C) represents an exhaust gas-processing water to be fed by the first pump 29 to the cooling water spray member 27 of the cooling tower 26; the item (D) represents a cooling water to be supplied by the second pump 31 to the spray member 24; the item (E) represents the make-up water to be fed from the make-up water passageway 32; and the item (F) represents the water to be discharged from the blow-down passageway 33. These items (A) to (F) are also shown in FIG. 3.

Figure 4:
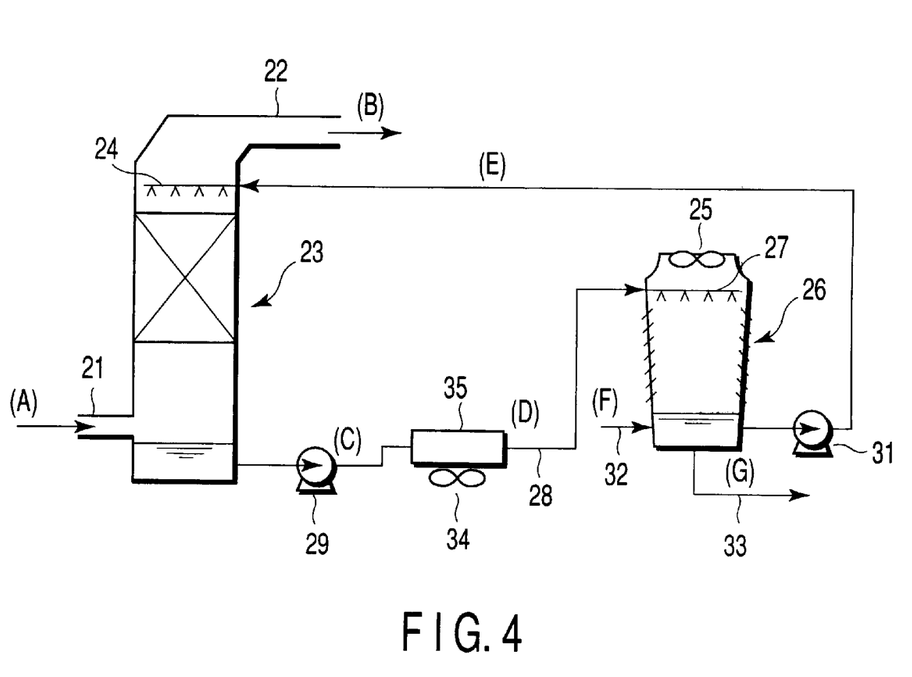
FIG. 4 is a schematic view illustrating the exhaust gas cooling system according to a fourth Embodiment of this invention.

According to this exhaust gas cooling system, on the occasion of supplying the exhaust gas-processing water from the bottom portion of the exhaust gas-processing tower 23 via the exhaust gas-processing water passageway 28 to the cooling water spray member 27 of the cooling tower 26 by means of the first pump 29, the exhaust gas-processing water can be cooled in advance by the air cooler 35 that has been provided at a midway of the exhaust gas-processing water passageway 28. As a result, it is possible to obtain almost the same effects as obtained in the aforementioned third Embodiment. Further, it is also possible to miniaturize the cooling tower 26 and also to reduce the cooling capacity thereof.

Further, since the exhaust gas to be introduced into the exhaust gas tower 23 is confined to an exhaust gas containing moisture such as an exhaust gas that will be produced through the combustion of hydrocarbon for instance, it is possible to allow the moisture to condense as the exhaust gas is cooled in the exhaust gas tower 23 by ejecting a cooling water against the exhaust gas from the spray member 24, thereby making it possible to obtain a condensed water

TABLE 4

| Item | (A) | (B) | (C) | (D) | (E) | (F) |
|---|---|---|---|---|---|---|
| Temperature (° C.) | 188 | 46 | 66 | 43 | 33 | 43 |
| Composition | | | | | | |
| $N_2$ (mol %) | 68.79 | 80.49 | — | — | — | — |
| $O_2$ (mol %) | 0.85 | 0.99 | — | — | — | — |
| $CO_2$ (mol %) | 8.08 | 9.45 | — | — | — | — |
| $H_2O$ (mol %) | 22.28 | 9.07 | 100.00 | 100.00 | 100.00 | 100.00 |
| Total (mol %) | 100.00 | 100.00 | 100.00 | 100.00 | 100.00 | 100.00 |
| Exhaust gas flow rate ($Nm^3$/hr) | 46,693 | 39,908 | — | — | — | — |
| Flow rate of cooling water (kg/hr) | — | — | 236,400 | 230,900 | 6,500 | 1,200 |

As seen from Table 4, according to the exhaust gas cooling system of the third Embodiment shown in FIG. 3, it is possible to sufficiently cool the exhaust gas down to a low temperature (46° C.) as in the case of the conventional exhaust gas cooling system shown in FIG. 5 (Table 2). Further, the quantity of the make-up water to the cooling tower 26 as well as the quantity of blow-down from the cooling tower 26 can be further reduced as compared with the conventional exhaust gas cooling system shown in FIG. 5. Moreover, according to this third Embodiment shown in FIG. 3, it is possible to reduce the capacity of the second pump 31 as compared with the capacity of the second pump 112 of the conventional exhaust gas cooling system shown in FIG. 5. It is also possible to reduce the motive power of the pump.

(Fourth Embodiment)

FIG. 4 is a schematic view illustrating the exhaust gas cooling system according to a fourth Embodiment of this invention. By the way, the same members or components as those shown in FIG. 3 will be identified by the same numbers thereby omitting the explanation thereof.

This exhaust gas cooling system is featured in that an air cooler 35 provided with a fan 34 is disposed at a midway of the exhaust gas-processing water passageway 28 which is located between the first pump 29 and the cooling water spray member 27.

which is free from salts such as calcium and to incorporate the condensed water into the exhaust gas-processing water. Therefore, by directly supplying this exhaust gas-processing water incorporated with the condensed water to the cooling tower 26 via the exhaust gas-processing water passageway 28, the condensed water can be utilized as part of the make-up water for the cooling tower 26. Therefore, it will be no more necessary to obtain the supply of make-up water from the make-up passageway 32.

Table 5 shows the temperature of exhaust gas after cooling, the quantity of make-up water at the cooling tower, and the quantity of blow-down, etc., all of which were obtained when the exhaust gas cooling system according to the fourth Embodiment and constructed as shown in FIG. 4 was operated using a water-containing exhaust gas having the temperatures and components as shown in Table 5 under the conditions as shown in Table 5.

Namely, the item (A) in Table 5 represents an exhaust gas to be introduced via the gas inlet port 21 of the exhaust gas-processing tower 23; the item (B) represents an exhaust gas of the exhaust gas outlet pipe 22; the item (C) represents an exhaust gas-processing water to be fed by the first pump 29 to the air cooler 35; the item (D) represents an exhaust gas-processing water to be fed from the air cooler 35 to the cooling water spray member 27; the item (E) represents a cooling water to be supplied by the second pump 31 to the spray member 24 of the exhaust gas-processing tower 23; the item (F) represents the make-up water to be fed from the make-up water passageway 32; and the item (G) represents the water to be discharged from the blow-down passageway 33. These items (A) to (G) are also shown in FIG. 4.

TABLE 5

| Item | (A) | (B) | (C) | (D) | (E) | (F) | (G) |
|---|---|---|---|---|---|---|---|
| Temperature (° C.) | 188 | 46 | 66 | 50 | 43 | 33 | 33 |
| Composition | | | | | | | |
| $N_2$ (mol %) | 68.79 | 80.49 | — | — | — | — | — |
| $O_2$ (mol %) | 0.85 | 0.99 | — | — | — | — | — |
| $CO_2$ (mol %) | 8.08 | 9.45 | — | — | — | — | — |
| $H_2O$ (mol %) | 22.28 | 9.07 | 100.00 | 100.00 | 100.00 | 100.00 | 100.00 |
| Total (mol %) | 100.00 | 100.00 | 100.00 | 100.00 | 100.00 | 100.00 | 100.00 |
| Exhaust gas flow rate ($Nm^3/hr$) | 46,693 | 39,908 | — | — | — | — | — |
| Flow rate of cooling water (kg/hr) | — | — | 236,400 | 236,400 | 230,900 | 0 | 0 |

As seen from Table 5, according to the exhaust gas cooling system of the fourth Embodiment shown in FIG. 4, it is possible to sufficiently cool the exhaust gas down to a low temperature (46° C.) as in the case of the exhaust gas cooling system of the third Example shown in FIG. 3. Further, the quantity of the make-up water to be fed to the cooling tower 26 can be zero. Further, the quantity of blow-down from the cooling tower 26 can be further reduced as compared with the exhaust gas cooling system of the third Example shown in FIG. 3. These results can be attributed to the fact that in the case of the exhaust gas cooling system of the fourth Embodiment, the air cooler 35 is provided at a midway of the exhaust gas-processing water passageway 28, thus making it possible to further miniaturize the cooling tower 26 and also to reduce the cooling capacity thereof.

By the way, in the above exhaust gas cooling systems according to the first, second, third and fourth Embodiments, the exhaust gas to be treated is directed to one containing carbon dioxide, so that the temperature thereof is lowered down to such that is suited for the absorption and removal of carbon dioxide in these Embodiments. However, this cooling system can be also applied to other kinds of exhaust gas.

As explained above, according to this invention, a portion of exhaust gas-processing water incorporating therein the condensed water that has been derived from the condensation of moisture in the exhaust gas at the exhaust gas-processing tower is introduced as a make-up water into a cooling tower, thereby making it possible to minimize the load for processing waste water, to decrease the quantity of water to be supplied to the cooling tower, and to minimize the frequency of the blow-down from the cooling tower. Therefore, the exhaust gas cooling system proposed by this invention is suited for use in lowering the temperature of exhaust gas to a degree which is suited for the absorption and removal of carbon dioxide included in exhaust gas.

It is also possible according to this invention to omit a heat exchanger to thereby reduce the manufacturing cost of the system, and at the same time, to miniaturize the cooling tower and to reduce the capacity thereof. Therefore, it is possible to provide an exhaust gas cooling system which is suited for lowering the temperature of exhaust gas to a degree which is suited for the absorption and removal of carbon dioxide included in exhaust gas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas cooling system, comprising:
   an exhaust gas-processing tower provided at a lower portion with an inlet port for an exhaust gas containing moisture and also provided at an upper interior space with a spray member;
   a circulating passageway for circulating an exhaust gas-processing water from a bottom portion of said exhaust gas-processing tower to said spray member;
   a heat exchanger provided at a portion of said circulating passageway for cooling the exhaust gas-processing water;
   a cooling tower for generating cooling water by taking advantage of the evaporation heat of water, thereby allowing the cooling water to circulate passing through said heat exchanger; and
   a water supply passageway for supplying said exhaust gas-processing water passing through said circulating passageway to said cooling tower as a portion of make-up water.

2. The exhaust gas cooling system according to claim 1, wherein said exhaust gas-processing tower is provided with an exhaust gas outlet pipe connected with a carbon dioxide absorption tower.

3. The exhaust gas cooling system according to claim 1, further comprising:
   an air cooler provided at a portion of the circulating passageway located between an exhaust gas-processing water outlet port of said exhaust gas-processing tower and said heat exchanger.

4. An exhaust gas cooling system, comprising:

an exhaust gas-processing tower provided at a lower portion with an inlet port for an exhaust gas containing moisture and also provided at an upper interior space with a spray member; and a cooling tower for cooling an exhaust gas-processing water existing at a bottom portion of said exhaust gas-processing tower by taking advantage of the evaporation heat of water, thereby allowing the water thus cooled to be fed to a spray member of said exhaust gas-processing tower.

5. The exhaust gas cooling system according to claim 4, wherein said exhaust gas-processing tower is provided with an exhaust gas outlet pipe connected with a carbon dioxide absorption tower.

6. The exhaust gas cooling system according to claim 4, further comprising:

an air cooler provided at a portion of a passageway located between an exhaust gas-processing water outlet port of said exhaust gas-processing tower and said cooling tower.

* * * * *